Patented Apr. 24, 1928.

1,667,333

UNITED STATES PATENT OFFICE.

FRITZ STRAUB, OF BASEL, AND HERMANN SCHNEIDER, OF RIEHEN, NEAR BASEL, SWITZERLAND, ASSIGNORS TO THE FIRM SOCIETY OF CHEMICAL INDUSTRY IN BASLE, OF BASEL, SWITZERLAND.

DYESTUFFS AND PROCESS OF MAKING SAME.

No Drawing. Application filed March 12, 1926, Serial No. 94,317, and in Switzerland March 28, 1925.

The present invention relates to new azo dyestuffs containing metals valuable for the production of fast tints on the fibre. It comprises the new dyestsuffs, the process of making the same, and the material dyed with the new dyestuffs.

It has been found that new azo dyestuffs containing metals may be obtained by treating azo dyestuffs corresponding with the general formula:

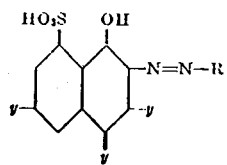

wherein the y's stand for hydrogen atoms which are replaced at least once and at most twice by sulfogroups which latter are not adjacent to each other and of which at least one is in 3 or 4-position, R meaning the residue of a coupling component having at least two nuclei such as naphthalene or phenyl-methylpyrazolone derivatives, with agents yielding metals, such as copper, nickel, cobalt or chromium compounds.

The new dyestuffs containing metals, which are to be considered as complex metal compounds of the azo dyestuffs of the above indicated general formula, form reddish-brown to blackish powders, dissolving in water and in dilute caustic soda solution with orange to brown, red-violet, blue and blackish coloration, yielding on wool, when dyed from an acid bath, red to violet, blue and black tints.

The azo dyestuffs used as parent material in this invention corresponding with the general formula:

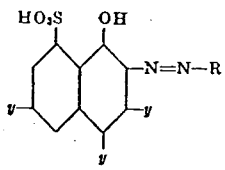

wherein R and the y's have the above indicated meaning, are partially known and may be obtained by reaction of diazo compounds of the 2:1-aminonaphthol-4:8 or 3:8-disulfonic acids with all kinds of coupling components. If the coupling is realized in the usual manner, i. e. in more or less concentrated solution alkaline with caustic soda, dyestuffs are obtained, but their formation takes place very slowly and with bad yield.

It has now been found that, by carrying out the coupling in presence of concentrated caustic potash solution, the formation of the dyestuff occurs very rapidly and with excellent yield. The technical manufacture of the dyestuffs which are the subject matter of the present invention has thus only been made possible by the discovery of the coupling process herein disclosed.

Example 1.

Into a mixture of 56 parts of caustic potash, 46 parts of water and 15 parts of β-naphthol there are introduced, while stirring, at about 50°, 60 parts of the diazo compound of 2-amino-1-hydroxynaphthalene-4:8-disulfonic acid in form of a paste of 55.5% strength. The whole is stirred for some time at the same temperature until disparition of the diazo compound, diluted with 300 parts of water, neutralized with not too dilute mineral acid and the dyestuff corresponding with the formula:

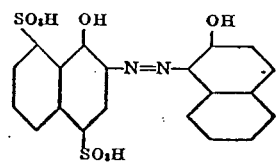

precipitated with common salt. It forms a dark powder, dissolving in dilute acetic acid and dilute caustic soda solution with blue-red, in dilute soda solution with cyaneous and in concentrated sulfuric acid with violet coloration. It yields on wool blue-red tints changing by afterchroming to blue with partial destruction of the dyestuff, and to violet by after-coppering. The isomeric dyestuff from α-naphthol dissolves in dilute acetic acid and dilute caustic soda solution with bluish-red and red-violet, in dilute soda solution with violet coloration, in concentrated sulfuric acid with blue coloration; the dyestuffs from 2:3-hydroxynaphthoic acid or 3-hydroxynaphthalene-1:8-dicarboxylic acid dissolve also with red-violet and blue-violet coloration in dilute acetic acid, and in dilute caustic soda solution with blue, in dilute soda solution and in concentrated sulfuric acid with violet to blue coloration. Their afterchromed dyeings on wool are light blue owing to strong destruction of the dyestuff, their aftercoppered dyeings are violet.

*Example 2.*

Into a mixture of 56 parts of caustic potash, 46 parts of water and 32 parts of 1-hydroxynaphthalene-3:8-disulfonic acid there are introduced, while stirring, at about 50°, 60 parts of the diazo compound of 2-amino-1-hydroxynaphthalene-4:8-disulfonic acid in form of a paste of 55.5% strength. The whole is stirred for some time at the same temperature until disparition of the diazo compound, diluted with 300 parts of water, neutralized with not too dilute mineral acid and the dyestuff corresponding with the formula:

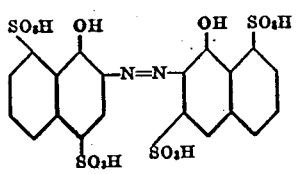

precipitated with common salt. It forms a dark powder, dissolving in dilute acetic acid and dilute caustic soda solution with blue-red and red-violet, in dilute soda solution with green-blue and in concentrated sulfuric acid with violet coloration. It yields on wool red-violet tints changing by afterchroming to light green-blue, and to fast violet by aftercoppering.

By replacing the 1-hydroxynaphthalene-3:8-disulfonic acid by other naphthalene derivatives, such as 1-hydroxynaphthalene-8-sulfonic acid, 2-hydroxynaphthalene-6-sulfonic acid, 1-hydroxynaphthalene-4:8-disulfonic acid, 1-hydroxy-3:6:8- or 4:6:8-trisulfonic acid, 2-hydroxynaphthalene-4:8-disulfonic acid, 1-hydroxynaphthalene-4-chloro-8-sulfonic acid, 1-hydroxynaphthalene-3:8- or 4:8-disulfamide, analogous dyestuffs are obtained, dissolving in dilute acetic acid with red to blue-red, in dilute caustic soda solution with red-violet to blue-red, in dilute soda solution with red-violet to green-blue, and in concentrated sulfuric acid with red-violet to blue-red coloration, the aftercoppered dyeings on wool being red to blue-violet, the afterchromed dyeings being light blue to green-blue.

*Example 3.*

Into a mixture of 56 parts of caustic potash, 46 parts of water and 18.3 parts of 1-phenyl-3-methyl-5-pyrazolone there are introduced, while stirring, at about 80°, 60 parts of the diazo compound of 2-amino-1-hydroxynaphthalene-3:8-disulfonic acid in form of a paste of 55.5% strength. The whole is stirred for some time at the same temperature until disparition of the diazo compound, diluted with 300 parts of water, neutralized with not too dilute mineral acid and the dyestuff corresponding with the formula:

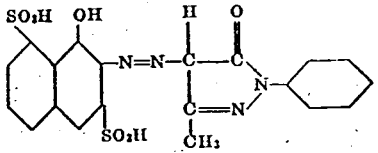

precipitated with common salt. The new dyestuff forms a reddish-brown powder, dissolving in water with orange and in dilute caustic soda solution with reddish-orange coloration, yielding on wool orange tints which change to red by afterchroming.

By replacing this pyrazolone derivative by the barbituric acid an analogous dyestuff is obtained dissolving in dilute acetic acid with orange, in dilute caustic soda solution with red, in concentrated sulfuric acid with orange coloration. It yields on wool orange tints which change to red by afterchroming, to red-brown by aftercoppering. The corresponding dyestuff from resorcylic acid forms a brown-red powder, dissolving in dilute acetic acid with red, in dilute caustic soda solution with black-violet, in concentrated sulfuric acid with blue-red coloration, dyeing wool red tints which are destroyed by afterchroming and become red-violet by aftercoppering.

*Example 4.*

52.6 parts of the dyestuff from the diazo compound of 2-amino-1-hydroxynaphthalene-4.8-disulfonic acid and 1-phenyl-3-methyl-5-pyrazolone are dissolved in 2000 parts of boiling water. To this solution there are added 21 parts of copper sulfate, dissolved in 300 parts of boiling water. The whole is boiled for some time, while neutralizing the free mineral acid with sodium acetate. The new dyestuff containing copper is then salted out. It forms an orange powder, dissolving in water and dilute caustic soda solution with red coloration, dyeing wool red tints.

The copper compounds of the dyestuffs of the Example 3 or of the isomeric dyestuffs from the 2-amino-1-hydroxynaphthalene-3:8-disulfonic acid dissolve in water and in dilute caustic soda solution with orange to brown and bluish-red coloration, dyeing wool reddish-brown to violet tints.

The corresponding chromium compounds dye wool bluish-red to violet tints.

*Example 5.*

67.8 parts of the dyestuff from the diazo compound of 2-amino-1-hydroxynaphthalene-4.8-disulfonic acid and 1-hydroxynaphthalene-4.8-disulfonic acid corresponding with the formula:

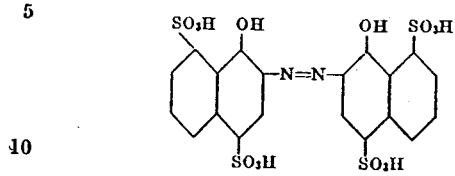

are dissolved in 1500 parts of boiling water. To this solution there are added 21 parts of copper sulfate dissolved in 300 parts of boiling water, the whole is boiled for some time, while neutralizing the liberated mineral acid with sodium acetate. The dyestuff containing copper thus obtained is then salted out. It forms a dark powder, dissolving in water and in dilute caustic soda solution with red-violet coloration and dyeing wool from an acid bath red-violet fast tints. The dyestuffs of the Examples 1 and 2 yield copper derivatives dyeing wool also violet to blue-violet fast tints, those of Example 3 yield on wool by the same treatment red to red-brown tints.

The cobalt and nickel compounds of these dyestuffs, which are formed in the same manner, but using nickel sulfate or cobalt sulfate instead of copper sulfate, dye wool claret to reddish violet.

Example 6.

49.7 parts of the dyestuff from diazotized 2-amino-1-hydroxynaphthalene-4:8-disulfonic acid and β-naphthol are introduced into a solution of alkali metal chromite obtained by treating 100 parts of a chromium-hydroxide hydrate paste, corresponding with 17.4 parts of $Cr_2O_3$, with 60 parts of potash and heating until a clear solution is formed. The mass is then heated at 80° until the whole chromium has been taken up by the azo dyestuff. The reaction mixture is then diluted with water, neutralized with mineral acid and the dyestuff thus obtained salted out with common salt. It forms a dark powder, dissolving in water with blue, in dilute caustic soda solution with red-violet coloration, yielding on wool, when dyed from an acid bath, fast navy-blue tints.

Similar products are obtained if instead of alkali metal chromite chromium fluoride, chromium acetate or formate or chromium hydroxide hydrate are employed as agents yielding chromium.

The isomeric dyestuff containing chromium from α-naphthol shows analogous properties.

Very similar are also the properties of the isomeric dyestuffs from the 2-amino-1-hydroxynaphthalene-3:8-disulfonic acid.

The other dyestuffs of Example 1 from 2:3-hydroxynaphtholic acid and from 3-hydroxynaphthalene-1:8-dicarboxylic acid yield chromium compounds dissolving in water with violet and green-blue, in dilute caustic soda solution with red-violet and violet coloration. They yield on wool when dyed from an acid bath and when printed on cotton fast blue tints.

Example 7.

67.8 parts of the dyestuff from the diazo compound of 2-amino-1-hydroxynaphthalene-4:8-disulfonic acid and 1-hydroxynaphthalene-3:8-disulfonic acid are dissolved in 1500 parts of boiling water. To the solution thus obtained there are added 20 parts of chromium oxide in form of a chromium fluoride solution, the whole being heated together in the presence of glass powder until the dyestuff containing chromium is formed. The dyestuff solution is then concentrated by evaporation and the new dyestuff is obtained by crystallization or by salting out. It forms a dark powder, dissolving in water with blue, in dilute caustic soda solution with violet coloration, yielding on wool, when dyed from an acid bath, blue tints. The dyestuff described in Example 2 yields chromium compounds showing similar properties, i. e. they dissolve in water with blue to green-blue, in dilute caustic soda solution with violet coloration, yielding on wool, when dyed from an acid bath, fast blue tints.

What we claim is:

1. As a step in the production of complex metal compounds of the dyestuffs corresponding with the general formula:

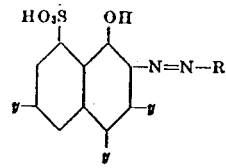

wherein the y's stand for hydrogen atoms which are replaced at least once and at most twice by sulfogroups which latter are not adjacent to each other and of which at least one is in 3 or 4-position, R meaning the residue of a coupling component having at least two nuclei, the herein described process which consists in the coupling of the diazotized aminohydroxynaphthalene disulfonic acids corresponding with the general formula:

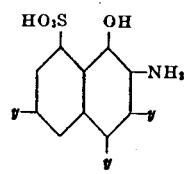

wherein the y's stand for hydrogen atoms which are replaced at least once and at most twice by sulfogroups which latter are not adjacent to each other and of which at least one is in 3 or 4-position, with a coupling component having at least two nuclei in a highly concentrated caustic potash medium.

2. As a step in the production of complex metal compounds of the dyestuffs corresponding with the general formula:

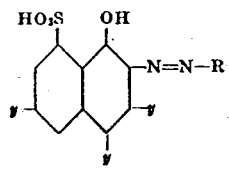

wherein the y's stand for hydrogen atoms which are replaced at least once and at most twice by sulfogroups which latter are not adjacent to each other and of which at least one is in 3 or 4-position, R meaning a residue of any hydroxynaphthalene compound, the herein described process which consists in the coupling of the diazotized aminohydroxynaphthalene-disulfonic acids corresponding with the general formula:

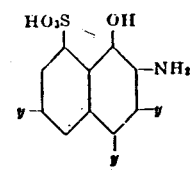

wherein the y's stand for hydrogen atoms which are replaced at least once and at most twice by sulfogroups which latter are not adjacent to each other and of which at least one is in 3 or 4-position, with any hydroxynaphthalene compounds in a highly concentrated caustic potash medium.

3. As a step in the production of complex metal compounds of the dyestuffs corresponding with the general formula:

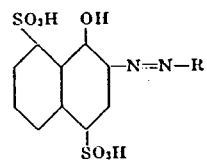

wherein R stands for a residue of any hydroxynaphthalene compound, the herein described process which consists in the coupling of the diazotized aminonaphthol-disulfonic acid corresponding with the formula:

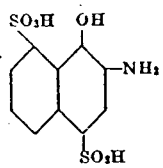

with any hydroxynaphthalene compounds in a highly concentrated caustic potash medium.

4. As a step in the production of complex metal compounds of the azo dyestuff corresponding with the formula:

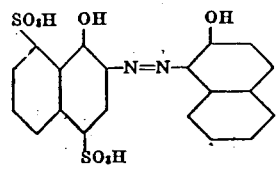

the herein described process which consists in the coupling of diazotized 2:1-aminohydroxynaphthalene-4:8-disulfonic acid with β-naphthol in a highly concentrated caustic potash medium.

5. As a step in the production of complex metal compounds of the azo dyestuffs corresponding with the general formula:

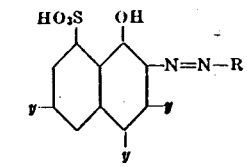

wherein the y's stand for hydrogen atoms which are replaced at least once and at most twice by sulfogroups which latter are not adjacent to each other and of which at least one is in 3 or 4-position, R meaning a residue of a coupling component having at least two nuclei, the herein described process which consists in the treatment of the azo dyestuffs corresponding with the above explained general formula, with trivalent compounds of chromium.

6. As a step in the production of complex metal compounds of the azo dyestuffs corresponding with the general formula:

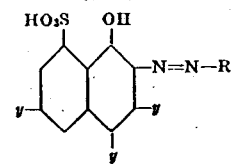

wherein the y's stand for hydrogen atoms which are replaced at least once and at most twice by sulfogroups which latter are not adjacent to each other and of which at least one is in 3 or 4-position, R meaning a residue of any naphthol compound, the herein described process which consists in the treatment of the azo dyestuffs corresponding with the above explained general formula, with trivalent compounds of chromium.

7. As a step in the production of complex metal compounds of the azo dyestuffs corresponding with the general formula:

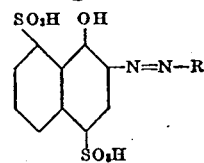

wherein R stands for a residue of any hydroxynaphthalene compound, the herein described process which consists in the treatment of the azo dyestuffs corresponding with the above explained general formula, with trivalent compounds of chromium.

8. As a step in the production of complex metal compounds of the azo dyestuff corresponding with the formula:

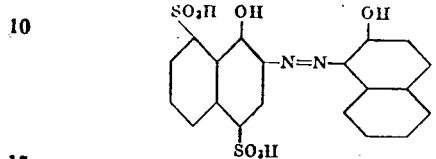

the herein described process which consists in the treatment of these azo dyestuffs with trivalent compounds of chromium.

9. As new azo dyestuffs containing metals, the herein described complex chromium compounds of the azo dyestuffs corresponding with the general formula:

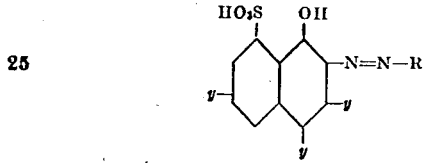

wherein the y's stand for hydrogen atoms which are replaced at least once and at most twice by sulfogroups which latter are not adjacent to each other and of which at least one is in 3 or 4-position, R meaning a coupling component having at least two nuclei which products form reddish-brown to blackish powders, dissolving in water and in dilute caustic soda solution with orange to brown, red-violet, blue and blackish coloration, and yielding on wool, when dyed from an acid bath, red to violet, blue and black fast tints.

10. As new azo dyestuffs containing metals the herein described complex chromium compounds of the azo dyestuffs corresponding with the general formula:

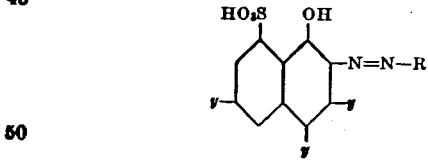

wherein the y's stand for hydrogen atoms which are replaced at least once and at most twice by sulfogroups which latter are not adjacent to each other and of which at least one is in 3 or 4-position, R meaning a residue of any hydroxynaphthalene compound, which products form blackish powders, dissolving in water with violet to green-blue, in dilute caustic soda solution with red-violet to violet coloration, yielding on wool, when dyed from an acid bath, fast blue tints.

11. As new azo dyestuffs containing metals the herein described complex chromium compounds of the azo dyestuffs of the general formula

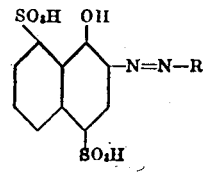

wherein R stands for a residue of any hydroxynaphthalene compound, which products form blackish powders, dissolving in water with violet to green-blue, in dilute caustic soda solution with red-violet to violet coloration, yielding on wool, when dyed from an acid bath, fast blue tints.

12. As new azo dyestuffs containing metals the herein described complex chromium compounds of the azo dyestuff corresponding with the formula

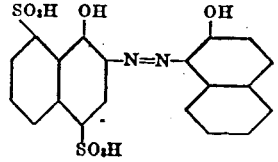

which products form blackish powders, dissolving in water with blue, in dilute caustic soda solution with red-violet coloration, yielding on wool, when dyed from an acid bath, fast navy-blue tints.

13. Material dyed with the dyestuffs of claim 9.

14. Material dyed with the dyestuffs of claim 10.

15. Material dyed with the dyestuffs of claim 11.

16. Material dyed with the dyestuffs of claim 12.

In witness whereof we have hereunto signed our names, this 24th day of February, 1926.

FRITZ STRAUB.
HERMANN SCHNEIDER.